Patented Oct. 8, 1929

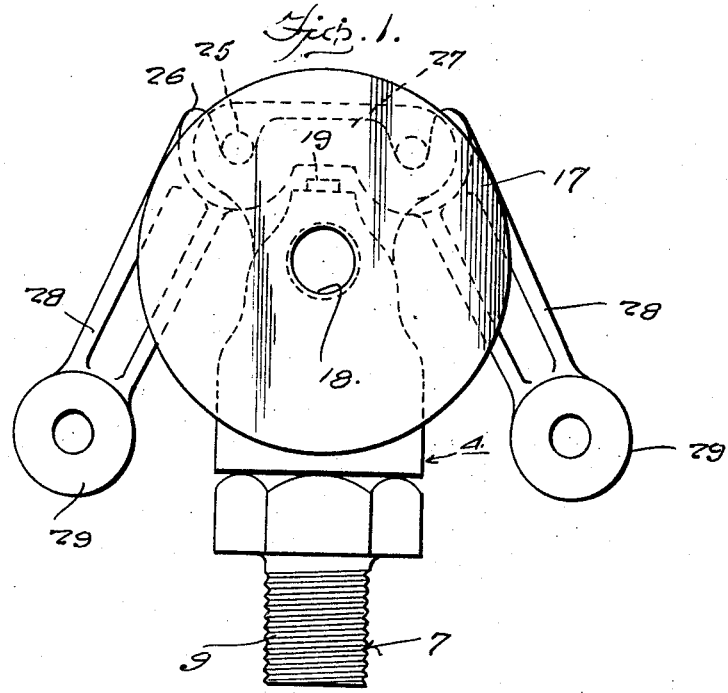
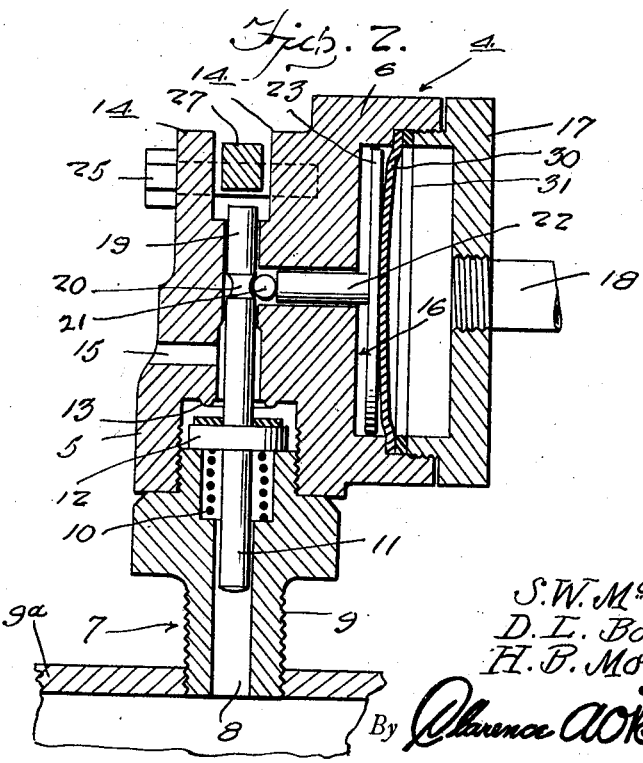

1,730,778

UNITED STATES PATENT OFFICE

SHANNON W. McCLUNG, DORSEY L. BOYD, AND HARRY B. MORRIS, OF HUNTINGTON, WEST VIRGINIA, ASSIGNORS TO SAMUEL F. NICHOLS, OF CHICAGO, ILLINOIS

AUTOMATIC BRAKE-RELEASING VALVE

Application filed July 23, 1928. Serial No. 294,830.

This invention relates to an improved valve which is constructed for association with an auxiliary reservoir and a brake cylinder in a manner to bleed air from the reservoir and to thereby release the brakes.

At the present time trains pulling into the receiving yards require the releasing of brakes. When the road engineer cuts away from the train, the brakes on each and every one of the cars throughout the entire train become set and must be released and the reservoirs on each car substantially drained of air, before the yard engines can pull the train from the receiving yard for purposes of classification, etc.

A brake releasing valve or bleed valve is now employed for this purpose, the same being usually tapped into a release support on the auxiliary reservoir, and manually operated through the medium of levers or rods. Under this arrangement however, it is necessary for the attendant to stand by and to hold the valves open, while the reservoir is bled in order to release the brakes which were previously set.

The present plan and means for accomplishing the releasing of brakes in the yard consumes much time and requires many employees. Hence, it is believed to be unduly expensive.

Bearing in mind the foregoing, we have evolved and produced a novel brake releasing valve wherein the same is opened by manually manipulated means, but is automatically retained in open position by a novel pneumatic latch and retaining device actuated by air pressure from an adjacent brake cylinder.

The present application is an improvement upon an application filed by us under date of August 22, 1927, and designated by Serial No. 214,728.

Broadly, the foregoing application relies for novelty upon a structure including a body having means for connection to the bleed port in an auxiliary reservoir, wherein said body is provided further, with an air release passage, together with a discharge port, in communication with the atmosphere.

Then there is a closing valve in the passage, for closing the port, and associated manually operable means for opening this valve, and a pneumatic latch and retainer for holding said valve open for a predetermined length of time, in order to allow the air to bleed through the discharge port.

The improvement relates to an improvement in the pneumatic latch construction, and particularly to a diaphragm such as serves to overcome the possibility of a leak or a blow-by, when brakes are set in the event the train is on a steep grade.

In the drawings:—

Figure 1 is a front elevational view, of an automatic brake releasing valve constructed in accordance with the present invention.

Fig. 2 is a central vertical sectional view showing the intimate association of details more plainly.

Referring now to the drawings by reference numerals, it will be seen that the numeral 4 designates generally a body or casting, made up of a pair of substantially right angularly disposed portions 5 and 6 respectively. The portion 5 is formed at its bottom, with an internally screw threaded socket into which a fitting 7 is threaded. The fitting is provided with an air passage 8, to receive air from the auxiliary reservoir, and a screw threaded nipple 9 is carried thereby, and is tapped into a screw threaded release port in the auxiliary reservoir 9ª, somewhat as is ordinarily done.

The fitting in turn is provided with a socket which accommodates the coiled spring 10 surrounding a guide pin 11 formed on the bottom of a disc valve 12. The valve 12 cooperates with a valve seat 13 in the socket as shown in Fig. 2. Formed in the part 5 above the socket is a longitudinal bore which opens through the top of the body and between a pair of spaced parallel plate-like portions 14.

Leading from one side of the bore is an exhaust or release port 15 in communication with the atmosphere. Leading from the opposite side of the bore above the port 15 is a guide passage which opens into a chamber 16 formed in the portion 6. Incidentally, this portion is screw threaded at its outer end and a closing cap 17 is fitted into said end, the cap having a central screw threaded hole with which piping 18 is connected. This piping is in turn connected with the brake cylinder.

Referring again to the valve 12 it will be seen that it carries an upstanding stem 19 which is slidable in said vertical bore. The upper end of the stem extends through and beyond the corresponding end of the bore. The intermediate portion of the stem is formed with an annular groove 20 functioning as a keeper seat. Cooperable with the groove 20 is a retainer ball 21 which is forced into the groove through the medium of a plunger 22.

The head 23 of the plunger is slidable in the chamber 16. Air coming from the brake cylinder on the opposite side of the plunger through the opening 18 serves to force the plunger in a direction to in turn force the retainer ball 21 into the groove 20 in the stem 19 for the purpose of holding the valve 12 open. It is desired to broadly refer to the plunger and the retainer ball as a pneumatic latch for maintaining the valve 12 off of the seat 13, in order to permit air to exhaust through the passage 8 and the escape ports 15.

A pair of fulcrum pins 25 are mounted in the aforesaid plates 14 and coperate with notches 26 in the bight portion 27 of a manually operable yoke. This bight portion is constructed so that the pins 25 extend through the notches while the lower edge thereof engages the upper end of the stem 19. The arms 28 of the yoke are formed at their lower ends with spaced eyes 29 with which cooperating rods are connected. These operating rods are of customary construction as is the yoke. They may be operated from either side of the car. Hence by operating either rod the yoke is rocked about the proper fulcrum pin 25 to force the stem downwardly and to open the valve 12.

As before intimated, the principal improvement in the present case is the means associated with the pneumatic latch structure, for preventing a blow-by of air and guarding against undesirable leakage on grades. Incidentally, it is to be noted that the coiled spring was employed to cooperate with the piston 23 in the pending case is omitted here, and that the head 23 of the plunger is in the form of a relatively thin disk.

Cooperating with this, is a flexible diaphragm 30 whose marginal portions are held in a counter-groove in the part 6 by way of a retaining ring 31, in turn clamped firmly in place by the screw-cap 17. This diaphragm, and the omission of the springs, constitutes the gist of the improvement, and overcomes disadvantages experienced with the structure referred to.

The operation of the invention is as follows:—Normally, the valve 12 is in firm contact with the valve seat 13, thus closing the passage of air through the discharge port 15. Assuming however, that it is desired to substantially drain the auxiliary reservoir of air with a view toward releasing the brakes, this is done by first manipulating the manually operable yoke.

In other words, either one of the operating rods are actuated to rock the yoke and to force the valve 12 down against the tension of the spring 10. As the stem 19 moves downwardly, owing to the action of the yoke, the grooves 20 are alined with the ball 21.

Since the branch 6 is connected through piping with the brake cylinder, the back pressure in the brake cylinder serves to force the diaphragm 30 and the plunger 23 in a manner to press the ball firmly into the groove and to thereby hold the valve 12 open for a certain length of time until most of the air has been drained or bled from the reservoir. Thus, we have a spring closed valve which is forced downwardly against the action of the spring through the medium of a manually manipulated yoke, this valve being provided with a grooved stem held down through the action of an air actuated retaining device or latch.

From the foregoing description and drawings, it will be seen that we have produced an exceptionally simple and inexpensive valve contrivance which can be included in the customary railway brake equipment without requiring extensive alterations of the existing details. The device is positive because the valve is first opened by manual means and this is dependable because the attendant can determine if the valve happened to be sticking.

In other entirely automatic devices, the valve sometimes sticks and it is difficult to determine whether the valve is open or closed. With this arrangement, however, the attendant comes along to each car and makes sure that the valve is open and then immediately releases the operating rod whereby the pneumatic latch comes into play and thereby holds the valve open until substantially all the air is drained whereupon the spring means returns the parts to their normal relationship. This obviates the necessity of employing a makeshift chock such as is frequently employed for holding the valve open.

Persons familiar with inventions of this class will doubtless be able to obtain a clear understanding of the construction and advantages of the same, therefore a more lengthy description is thought unnecessary.

Minor changes in shape, size, and rearrangement of parts coming within the field of invention claimed may be resorted to if desired.

Having thus described our invention, what we claim as new is:—

1. In a brake releasing valve of the class described, a body having means for connection to the bleed port in an auxiliary reservoir, said body also having an air release passage provided in a discharge port in communication with the atmosphere, a closing valve in said passage for closing said port, manually operable means for opening said valve, and a pneumatic latch and retainer for holding the valve opened for a length of time to allow air to bleed through, said discharge port, comprising a slidable piston, and a flexible air packing diaphragm operable therewith.

2. In a brake releasing device of the class described, a bored body having a release port in communication with the bore on one side, and a guide passage in communication with the bore on the opposite side and having a valve seat at the lower end of said bore, a fitting carried by the body and adapted for connection with an auxiliary reservoir, a spring pressed valve associated with the body and fitting and cooperable with said valve seat, said valve having a stem slidable in said bore, and being provided with an intermediate annular groove forming a keeper seat, a ball located in said guide passage and cooperable with said seat, a fluid actuated plunger mounted on the body and engageable with said ball for forcing the latter into said groove to retain the valve unseated, a manually manipulated yoke mounted on the body and engageable with the upper end of said stem, diaphragms cooperable with said fluid actuated plunger.

3. In a brake releasing device of the class described, a bored body having an air discharge port in communication with the bore, said body adapted to be mounted upon an auxiliary reservoir, there being a valve seat formed in the body in alinement with said bore, a spring closed valve cooperable with said seat, said valve having a stem slidable in said bore, a manually manipulated operating device mounted on the body and engageable with said stem for unseating the valve against the tension of said spring, an automatically operable pneumatic latch and retaining device carried by said body and cooperable with said stem for holding said valve unseated for a length of time, said pneumatic latch retaining device embodying a slidably mounted plunger and a flexible air-proofing diaphragm associated with the head of the plunger to guard against leakage of air by the plunger.

In testimony whereof we affix our signatures.

SHANNON W. McCLUNG.
DORSEY L. BOYD.
HARRY B. MORRIS.